US012191939B2

(12) United States Patent
Dai et al.

(10) Patent No.: US 12,191,939 B2
(45) Date of Patent: Jan. 7, 2025

(54) MULTIPLE-INPUT MULTIPLE-OUTPUT TRANSMISSION AND RECEPTION

(71) Applicant: British Telecommunications public limited company, London (GB)

(72) Inventors: Linglong Dai, London (GB); Talha Mir, London (GB); Muhammad Siddiqi, London (GB); Mo Hao, London (GB); Richard Mackenzie, London (GB)

(73) Assignee: British Telecommunications Public Limited Company (GB)

( * ) Notice: Subject to any disclaimer, the term of this patent is extended or adjusted under 35 U.S.C. 154(b) by 559 days.

(21) Appl. No.: 17/594,354

(22) PCT Filed: Apr. 6, 2020

(86) PCT No.: PCT/EP2020/059764
§ 371 (c)(1),
(2) Date: Oct. 12, 2021

(87) PCT Pub. No.: WO2020/207973
PCT Pub. Date: Oct. 15, 2020

(65) Prior Publication Data
US 2022/0190888 A1 Jun. 16, 2022

(30) Foreign Application Priority Data
Apr. 10, 2019 (CN) .......................... 201910283582.1

(51) Int. Cl.
*H04B 7/0426* (2017.01)
*H04B 7/0456* (2017.01)
(Continued)

(52) U.S. Cl.
CPC ......... *H04B 7/0426* (2013.01); *H04B 7/0456* (2013.01); *H04B 7/0693* (2013.01);
(Continued)

(58) Field of Classification Search
CPC .. H04B 7/0426; H04B 7/0456; H04B 7/0693; H04B 7/0877; H04B 7/18502;
(Continued)

(56) References Cited

U.S. PATENT DOCUMENTS 9,967,014 B1 5/2018 Park et al.
10,236,921 B1 * 3/2019 Kohlhepp ............ H04B 7/2606
(Continued)

FOREIGN PATENT DOCUMENTS

| CN | 107809274 | | 3/2018 |
| CN | 108886826 | A | 11/2018 |
| WO | WO2013045012 | A1 | 4/2013 |

OTHER PUBLICATIONS

Reconfigurable Hybrid Beamforming for Dual-Polarized mmWave MIMO channels: Stochastic Channel Modeling and Architectural Adaption Methods, IEEE 2018 (Year: 2018).*
(Continued)

*Primary Examiner* — Tanmay K Shah
(74) *Attorney, Agent, or Firm* — PRANGER LAW PC

(57) ABSTRACT

Multiple-Input Multiple-Output (MIMO) transmitters, receivers and transceivers are disclosed, as well as other associated devices, systems and methods. In particular, aspects and embodiments of the disclosure relate to MIMO transmitters, receivers and transceivers implemented as modules of relay devices for signals transmitted to and/or from base-stations and/or mobile-stations, in particular when such devices are implemented on mobile and/or aerial vehicles, and in particular for transmitting, receiving and/or forwarding wireless communication signals at frequencies in what is termed the "millimeter-wave band". In such devices, a power control unit is configured to determine an energy availability measure and/or a power demand measure and, in response, cause a switching unit to connect a
(Continued)

Hybrid precoding system and entities on a UAV plurality of RF chains to a plurality of antenna elements in different states.

17 Claims, 6 Drawing Sheets

(51) Int. Cl.
 H04B 7/06 (2006.01)
 H04B 7/08 (2006.01)
 H04B 7/185 (2006.01)
 H04W 52/02 (2009.01)

(52) U.S. Cl.
 CPC ....... *H04B 7/0877* (2013.01); *H04B 7/18502* (2013.01); *H04W 52/0251* (2013.01); *H04W 52/028* (2013.01)

(58) Field of Classification Search
 CPC .. H04B 1/082; H04B 7/15528; H04B 7/0691; H04B 7/0874; H04W 52/0251; H04W 52/028
 USPC ........................................................ 375/267
 See application file for complete search history.

(56) References Cited

U.S. PATENT DOCUMENTS

| | | |
|---|---|---|
| 10,714,836 B1 | 7/2020 | Karabacak et al. |
| 10,848,204 B2 | 11/2020 | Almasi et al. |
| 10,897,286 B2 | 1/2021 | Liang et al. |
| 10,950,937 B2 | 3/2021 | Ko et al. |
| 11,438,046 B2 | 9/2022 | Dai et al. |
| 11,509,365 B1 | 11/2022 | Karabacak et al. |
| 2015/0103953 A1 | 4/2015 | Lee et al. |
| 2017/0062948 A1 | 3/2017 | Artemenko et al. |
| 2017/0098963 A1* | 4/2017 | Takahashi ........... H02J 7/00034 |
| 2018/0083672 A1 | 3/2018 | Alexander |
| 2019/0028166 A1 | 1/2019 | Freedman |
| 2019/0319355 A1 | 10/2019 | Ko et al. |
| 2019/0319363 A1 | 10/2019 | Ko et al. |
| 2019/0356359 A1 | 11/2019 | Almasi et al. |
| 2019/0393948 A1 | 12/2019 | Zhao et al. |
| 2020/0028556 A1 | 1/2020 | Inoue et al. |
| 2020/0112378 A1 | 4/2020 | Holzheimer et al. |
| 2021/0226670 A1 | 7/2021 | Almasi et al. |
| 2021/0344393 A1 | 11/2021 | Dai et al. |
| 2022/0131578 A1 | 4/2022 | Junttila et al. |

OTHER PUBLICATIONS

"UAV air-to-ground channel characterization for mmWave systems" by Wahab Khawaja, Ozgur Ozdemir and Ismail Guvenc (Vehicular Technology Conference (VTC-Fall), 2017 IEEE 86th).
"Relay Hybrid Precoding Design in Millimeter-Wave Massive MIMO Systems" by X. Xue, Y. Wang, L. Dai and C. Masouros (IEEE Transactions on Signal Processing, vol. 66, No. 8, pp. 2011-2026, 15 Apr. 15, 2018).
"Phase Shifters vs Switches: An Energy Efficiency Perspective on Hybrid Beamforming" by S. Payami, N. M. Balasubramanya, C. Masouros, and M. Sellathurai (IEEE Wireless Communications Letters, vol. 8, No. 1, Feb. 2019).
"Hybrid Analog-Digital Beamforming for Massive MIMO Systems" by Shahar Stein and Yonina C. Eldar (available online at www.arxiv.org.
"Partially-Activated Conjugate Beamforming for LoS Massive MIMO Communications" by Wendong Liu, Zhaocheng Wang, Jianfei Cao and Sheng Chen (IEEE Access PP(99): 1-1, Oct. 2018).
International Preliminary Report on Patentability for PCT application No. PCT/EP2020/059764 issued Jul. 15, 2021.
PCT International Search Report for PCT/EP2020/059764 Dated Jun. 16, 2020.
Sau-Hsuan,Iu et al.: " Reconfigurable Hybrid Beamforming for Dual- Polarized mmWave MIMO Channels: Stochastic Channel Modeling and Architectural Adaptation Methods", IEEE Transactions On Communications., vol. 66, No. 2, Feb. 1, 2018 (Feb. 1, 2018), pp. 741-755, XP055682361, Piscataway, NJ. USA. ISSN: 0090-6778, DOI: 10.1 109/TCOMM . 2AL7 .27 62689 Sections V.A, VI, VII figures 2, 4, 8.
Written Opinion of the International Preliminary Examining Authority for PCT/EP2020/059764 Dated Feb. 24, 2021.
International Preliminary Report on Patentability received for PCT Patent Application No. PCT/EP2019/074532, mailed on Feb. 10, 2021, 24 pages.
International Search Report and Written Opinion received for PCT Patent Application No. PCT/EP2019/074532, mailed on Jan. 29, 2020, 20 pages.
Invitation to Pay Additional Fees with Partial International Search received for PCT Patent Application No. PCT/EP2019/074532, mailed on Nov. 18, 2019, 16 pages.
Office Action received for Chinese Patent Application No. 202080034617.9, mailed on Dec. 11, 2023, 9 pages (English Translation Only).
Office Action received for European Patent Application No. 19769142. 1, mailed on May 3, 2023, 5 pages.
Office Action received for European Patent Application No. 20717183. 6, mailed on Nov. 30, 2023, 6 pages.
Written Opinion received for PCT Patent Application No. PCT/EP2019/074532, mailed on Dec. 3, 2020, 12 pages.
Ahmed , et al., "A Survey on Hybrid Beamforming Techniques in 5G: Architecture and System Model Perspectives", IEEE Communications Surveys & Tutorials, vol. 20, No. 4, 2018, pp. 3060-3097.
Bogale , et al., "On the Number of RF Chains and Phase Shifters, and Scheduling Design With Hybrid Analog-Digital Beamforming", IEEE Transactions on Wireless Communications, IEEE Service Center, vol. 15, No. 5, May 1, 2016, pp. 3311-3326.
Brady , et al., "Beamspace MIMO for Millimeter-Wave Communications: System Architecture, Modeling, Analysis, and Measurements", IEEE Transactions on Antennas and Propagation, vol. 61, No. 7, Jul. 2013, pp. 3814-3827.
Brady , et al., "Wideband Communication with High-Dimensional Arrays: New Results and Transceiver Architectures", IEEE ICC Workshop, Jun. 2015, pp. 1042-1047.
Dai , et al., "Near-Optimal Hybrid Analog and Digital Precoding for Downlink mmWave Massive MIMO Systems", 2015 IEEE International Conference on Communications (ICC), IEEE, Jun. 8, 2015, pp. 1334-1339.
Gao , et al., "Energy-Efficient Hybrid Analog and Digital Precoding for MmWave MIMO Systems with Large Antenna Arrays", IEEE Journal on Selected Areas in Communications, vol. 34, No. 4, Apr. 2016, pp. 998-1009.
Gao , et al., "Low RF-Complexity Technologies to Enable Millimetre-Wave MIMO with Large Antenna Array for 5G Wireless Communications", IEEE Communications Magazine, Apr. 1, 2018, pp. 211-217.
Garcia-Rodriguez , et al., "Reduced Switching Connectivity for Large Scale Antenna Selection", IEEE Transactions on Communications, IEEE Service Centre, vol. 65, No. 5, May 2017, pp. 2250-2263.
Li , et al., "Statistical 3-D Beamforming for Large-Scale MIMO Downlink System Over Rician Fading Channels", IEEE Transactions on Communications, vol. 64, No. 4, Apr. 2016, pp. 1529-1543.
Zeng , et al., "Electromagnetic Lens-Focusing Antenna Enabled Massive MIMO: Performance Improvement and Cost Reduction", IEEE Journal on Selected Areas in Communications, vol. 32, No. 6, Jun. 2014, pp. 1194-1206.

\* cited by examiner

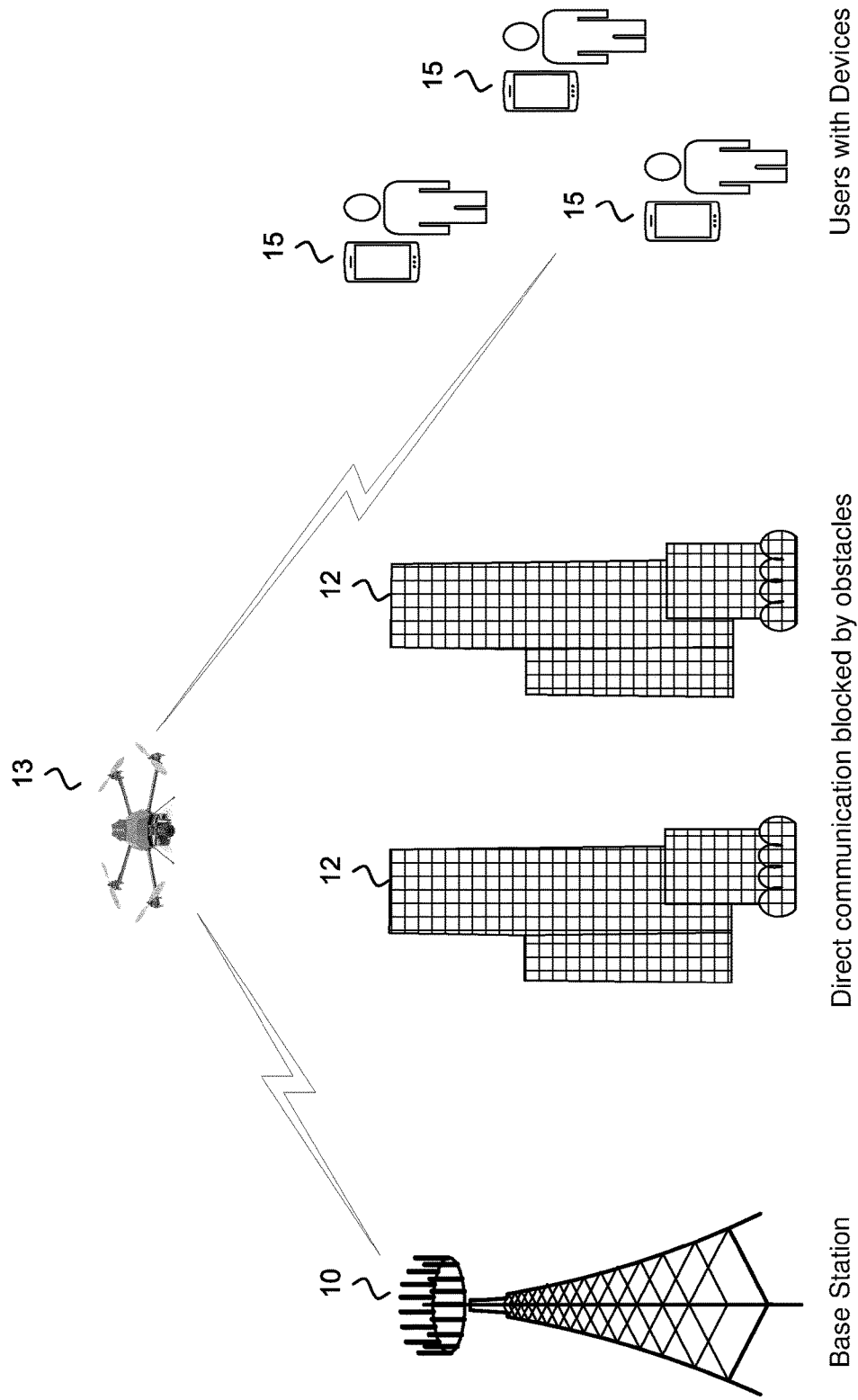
Figure 1: UAV-assisted mmWave MIMO system

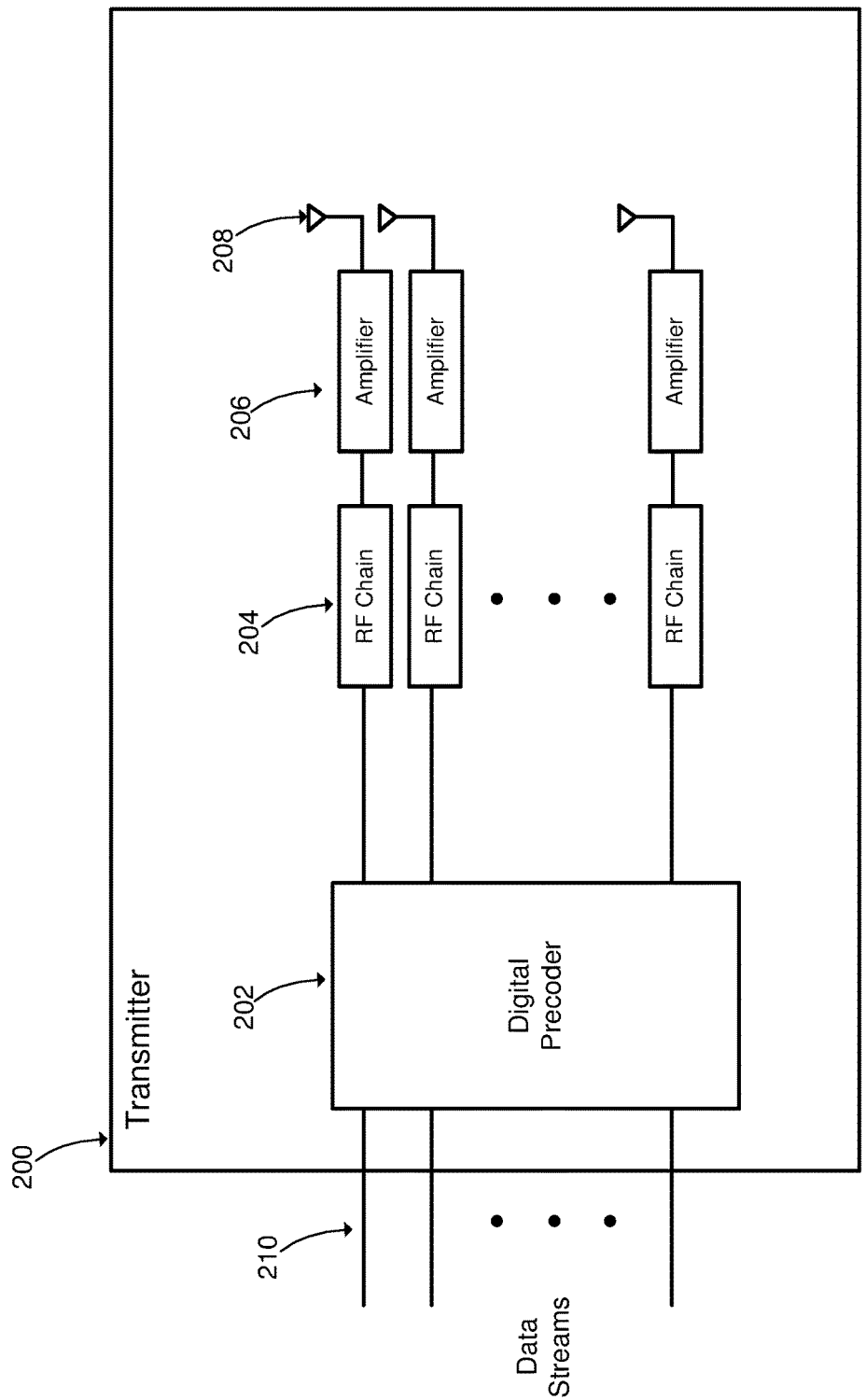
Figure 2: Example of a Fully Digitally Pre-coded MIMO Transmitter

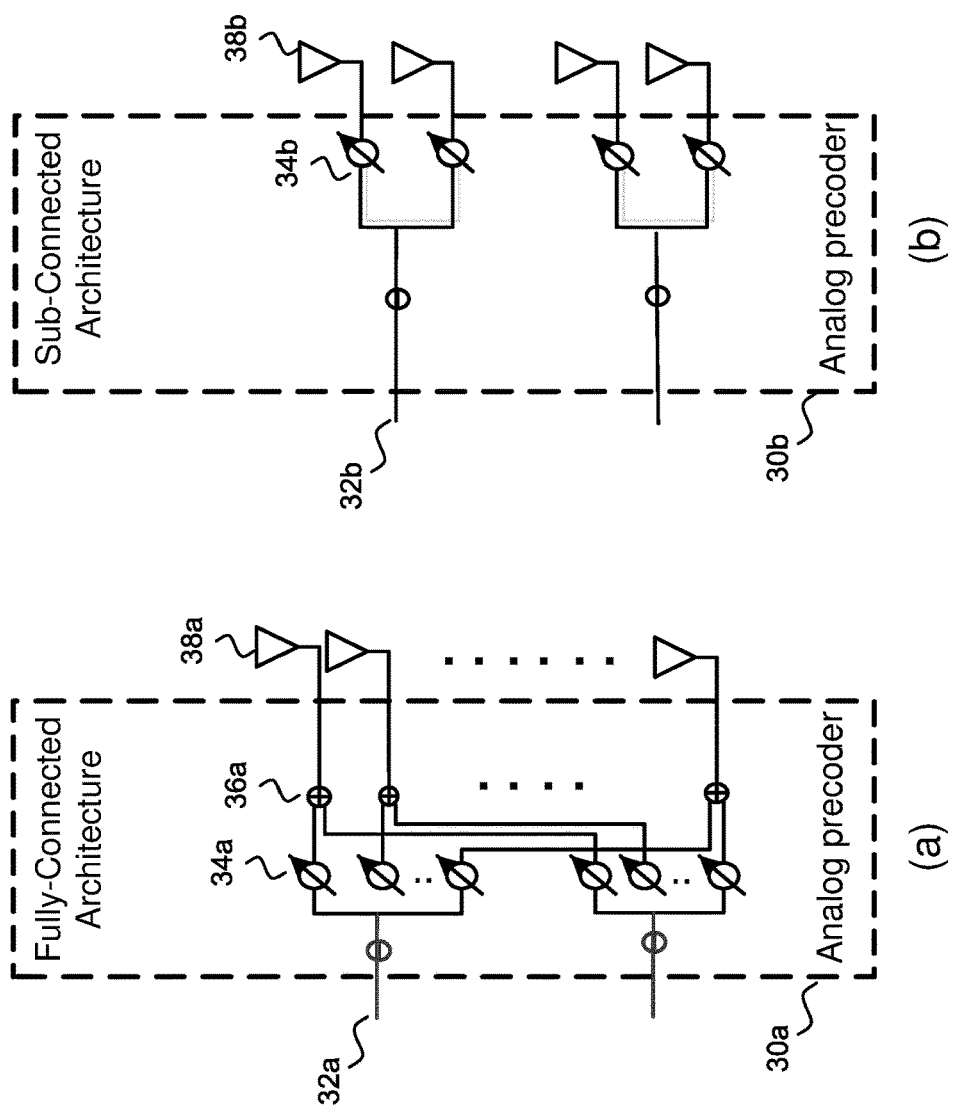
Figure 3: Different hybrid precoding implementations: (a) Fully-connected architecture; (b) Sub-connected architecture

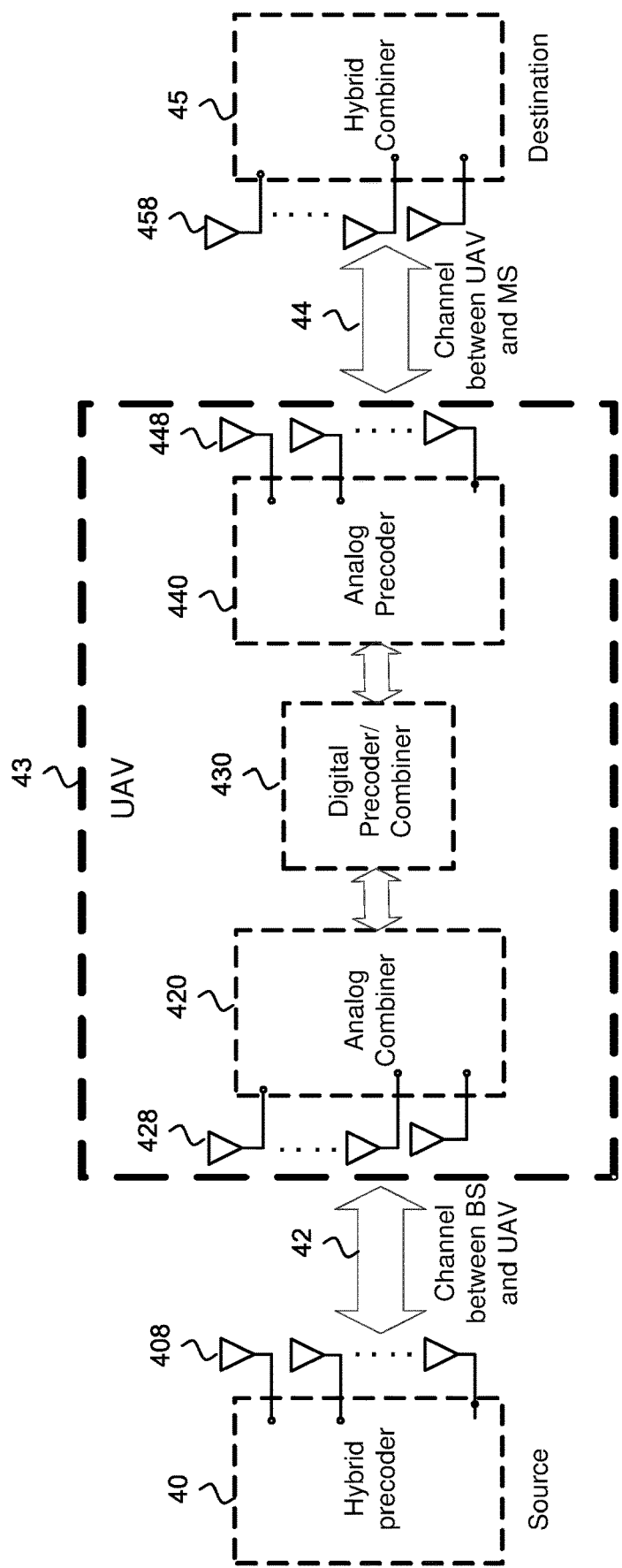
Figure 4: System configuration for providing hybrid precoding

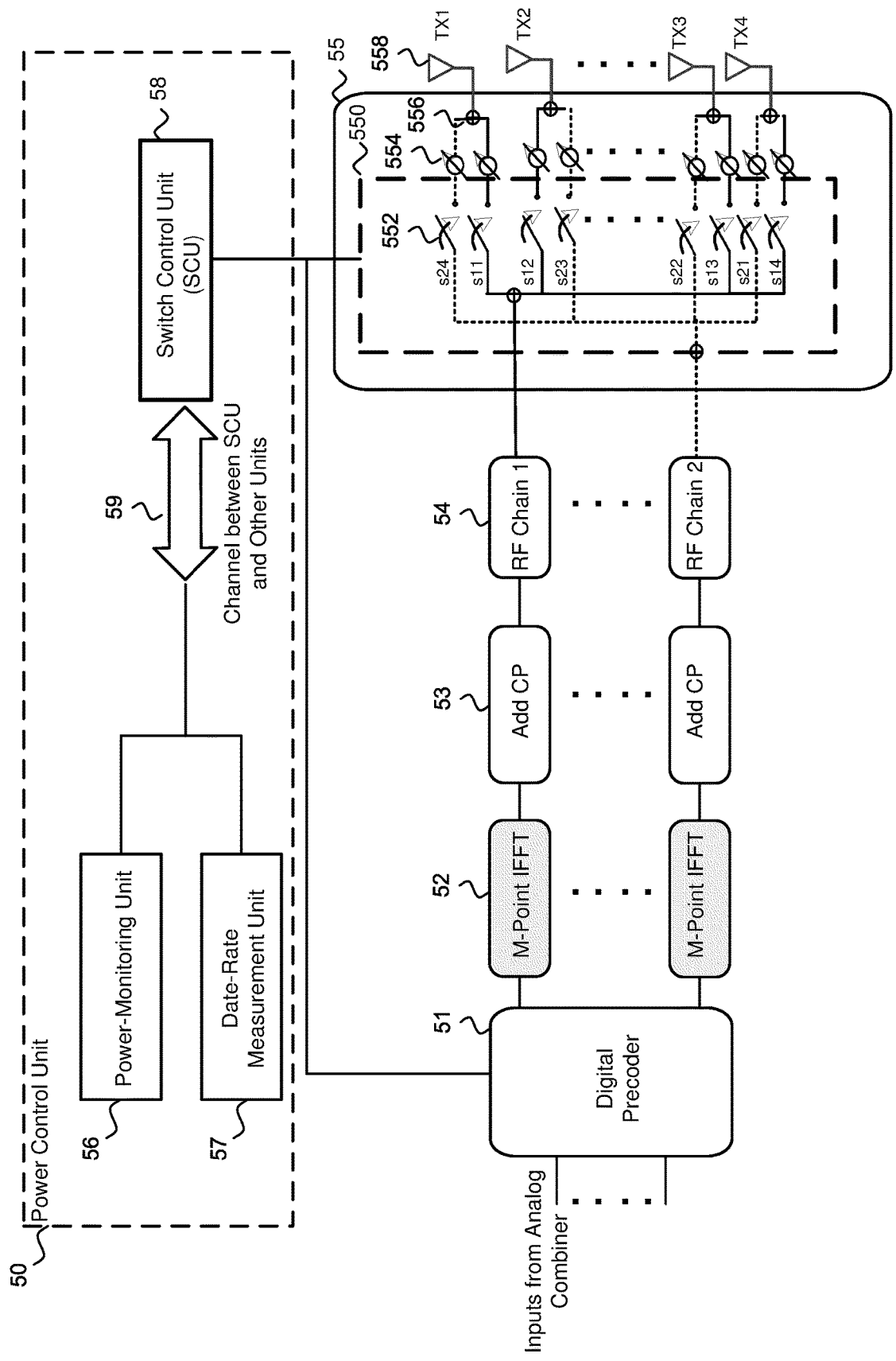
Figure 5: Hybrid precoding system and entities on a UAV

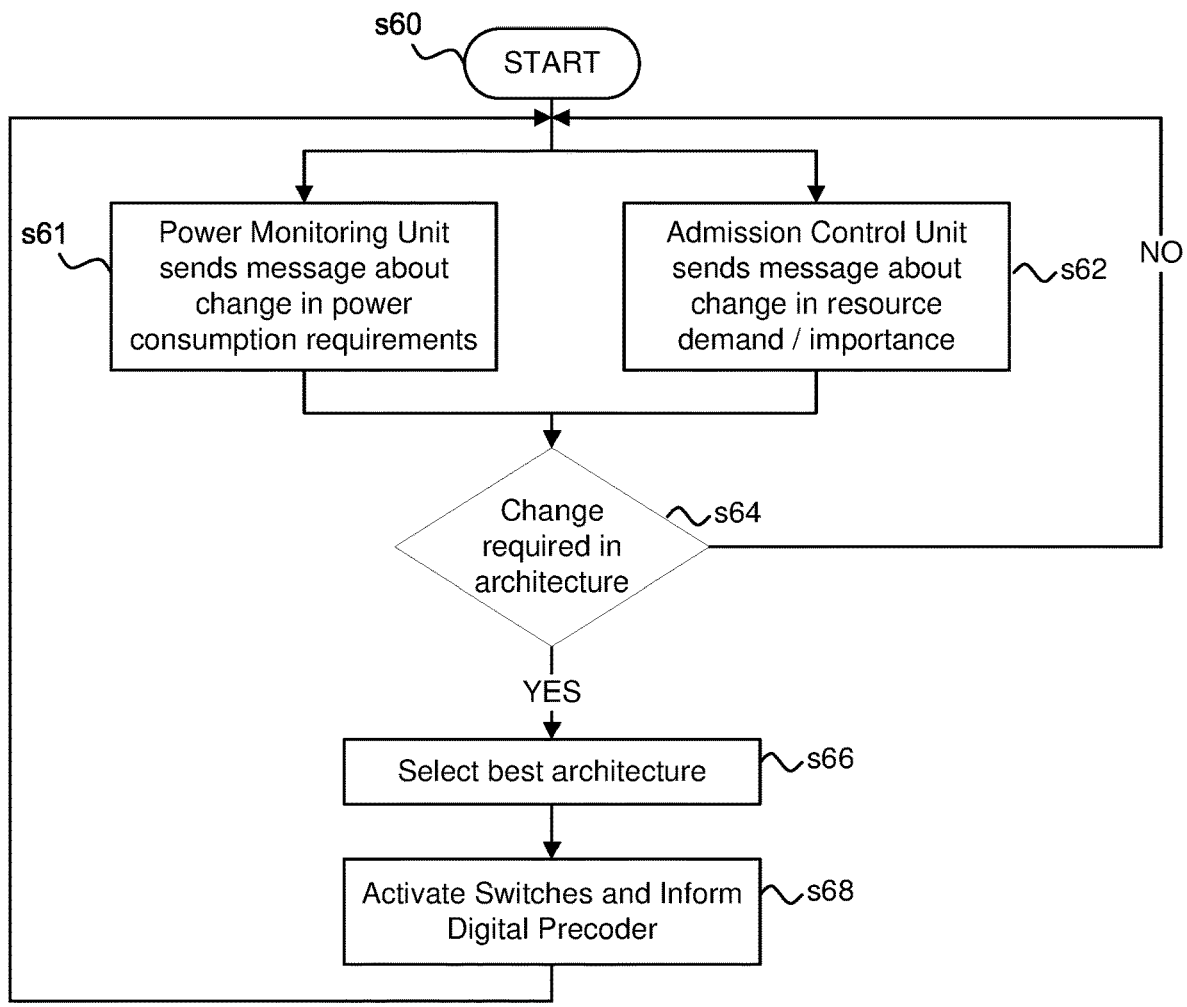
Figure 6: Decision-Making Process of Power-Control Unit
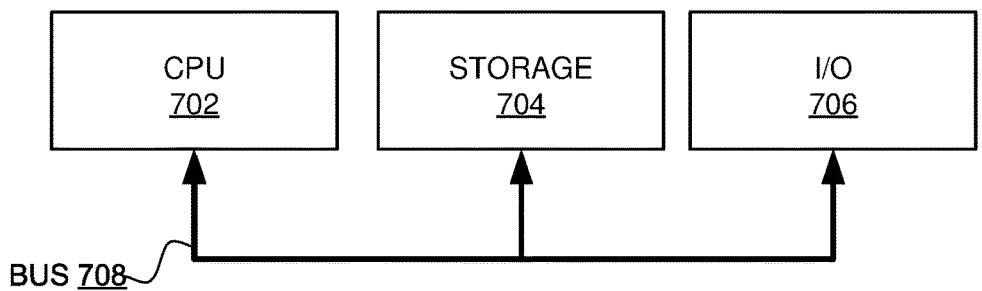
Figure 7: Elements of computer system

MULTIPLE-INPUT MULTIPLE-OUTPUT TRANSMISSION AND RECEPTION

PRIORITY CLAIM

The present application is a National Phase entry of PCT Application No. PCT/EP2020/059764, filed Apr. 6, 2020, which claims priority from Chinese Application No. 201910283582.1, filed Apr. 10, 2019, each of which is hereby fully incorporated herein by reference.

TECHNICAL FIELD

The present disclosure relates to Multiple-Input Multiple-Output (MIMO) transmitters, receivers and transceivers, as well as other associated devices, systems and methods. In particular, embodiments relate to MIMO transmitters, receivers and transceivers implemented as modules of relay devices for signals transmitted to and/or from base-stations and/or mobile-stations, in particular when such devices are implemented on mobile and/or aerial vehicles, and in particular for transmitting, receiving and/or forwarding wireless communication signals at frequencies in what is termed the "millimeter-wave band".

BACKGROUND

There has been increasing interest in millimeter-wave (mmWave) wireless communications systems due to their promise for meeting increasing bandwidth requirements of wireless devices. The phrase "millimeter-wave band" generally refers to frequencies from around a few gigahertz (for example 3.0 GHz) to a few hundred gigahertz, and mmWave systems typically operate in the frequency band of 30-300 GHz. This is a much larger frequency band than the sub-6 GHz band currently used for Long Term Evolution (LTE) networks and consequently larger bandwidths can be supported compared to those that can currently be supported with existing systems operating in the sub-6 GHz band.

One problem associated with mmWave communications is the relatively high free-space path-loss that can be experienced. This path-loss can cause heavy attenuation in signals that experience blockages (e.g. due to buildings or other large objects affecting the "line-of-sight" between a base-station and a mobile-station with which it may be trying to communicate) or that are communicated over long distances.

An approach to overcome this problem has been to implement mmWave communications within or using a multiple-input multiple-output (MIMO) system, which may be implemented on a relay node, which may be in a fixed location or may itself be implemented on a moving, possibly aerial vehicle such as an Unmanned Aerial Vehicle (UAV) or "drone", thereby allowing signals to be relayed over and/or around line-of-sight obstacles such as buildings. This scenario is illustrated in FIG. 1, which shows what is referred to as a UAV-assisted mmWave MIMO system.

In such a system, as shown in FIG. 1, a UAV 13 may be utilized as a movable relay node between a base-station (BS) 10 and one or more mobile stations (MS) 15 (symbolized in this example as users with mobile devices) which may not have line-of-sight communication with the base-station 10 due to obstacles such as buildings 12.

The relatively short wavelengths of mmWave communications enable the antenna-spacing of antenna elements in antenna arrays of MIMO systems (i.e. involving transmitters, receivers or transceivers and/or other components) to be reduced, and consequently enables a relatively large antenna-array (containing 256 to 1024 antenna elements, for example) to be packed in a relatively small physical size compared to what is achievable when operating in the sub-6 GHz band. These large antenna arrays are able to compensate effectively for the high path-loss induced by the higher frequency communications of mmWave.

Despite this, challenges remain to implement mmWave MIMO systems in practice.

Traditionally, MIMO systems have been implemented with full digital precoding. An example MIMO transmitter with full digital precoding is shown in FIG. 2.

In this example, the transmitter 200 comprises a digital precoder 202 and a plurality of radio frequency (RF) chains (denoted generally at 204) coupled to the digital precoder 202. Each RF chain is coupled to an antenna (denoted generally at 208). In the example shown here, each RF chain is coupled to a respective antenna by an amplifier, the amplifiers being denoted generally at 206.

The digital precoder 202 receives a plurality of data streams, denoted generally at 210, and operates to control the amplitude and phase of each received data stream to achieve a transmitted beam from the antennas 208 with a desired direction and gain. The data streams, once pre-coded, are passed through the RF chains 204. Each RF chain may support a single antenna element. The respective RF chains operate to convert the digitally pre-coded data streams into analogue signals for transmission by the respective antennas 208. Each RF chain typically includes transceiver circuitry for generating the analogue signals from the received digitally pre-coded data streams. The transceiver circuitry might include, for example, digital-to-analogue (DAC) converters (and possibly analogue-to-digital (ADC) converters, e.g. if the device is a MIMO transceiver), mixers and frequency converters. The output signals generated by each RF chain are then amplified by a respective amplifier 206 and transmitted from a respective antenna 208.

Full digital precoding provides a high level of design choice and enables high data rates and low interference between different data streams to be achieved. However, it also typically requires a dedicated RF chain for each antenna. For mmWave MIMO systems, where the number of antennas is typically large as explained above, this requirement may result in undesirably high hardware costs and power consumption. These issues may be of concern generally in relation to many types of mmWave MIMO systems, and may be of particular concern in relation to UAV-assisted mmWave MIMO systems, as these generally (when in use) are not able to be connected to a power supply other than a battery that must be carried on-board the UAV, or a power-supply such as a solar-panel power supply, whose performance may be variable and/or limited by factors such as weather, time-of-day and location, meaning that energy and/or power may be limited or constrained, or unreliable. This means that there may be a need to find a compromise between performance and power-usage (or energy-consumption).

While mmWave signals may experience issues such as severe path loss, penetration loss and rain fading when compared with signals in current cellular bands (3G or LTE), advantageously, as discussed above, the shorter wavelengths of mmWave frequencies enable more antennas to be packed in the same physical dimension, which makes them particularly suitable for large-scale spatial multiplexing and highly-directional beamforming. This has led to the advent of the large-scale multiple-input multiple-output (or "massive MIMO") concept for mmWave communications.

Although the principles of the precoding may be essentially the same regardless of the carrier frequency, it is not generally practical to use conventional fully-digital precoding schemes for large-scale antenna arrays. This is because the implementation of fully-digital precoding generally requires one dedicated RF chain per antenna element (including high-resolution digital-to-analog converters, mixers, etc.), which is prohibitive from both cost and power consumption perspectives at mmWave frequencies. Such configuration challenges the implementation of massive MIMO systems since a large number of power-hungry and costly RF chains can make the energy consumption and hardware costs of massive MIMO systems prohibitively high.

To solve this problem, a "hybrid" precoding technique (i.e. part-digital, part-analog) has recently been proposed for mmWave massive MIMO systems. The key idea of this is to split the functionality of a conventional digital precoder between a small-size digital precoder (realised by a small number of RF chains) and a large-size analog precoder (realized by a large number of phase-shifters (PSs)) to increase the antenna array-gain.

In general, mmWave communications are applied in line-of-sight (LOS) dominant scenarios since mmWave signals are sensitive to blockage (i.e. in comparison with longer-wavelength communication techniques), but to mitigate the negative effects caused by blockage, UAVs can be employed in mmWave massive MIMO systems (as discussed above in relation to FIG. 1). In such a UAV-assisted mmWave system, the channels from the base-station (BS) 10 to the UAV 13 and from the UAV 13 to the/each mobile station (MS) 15 may be line-of-sight, and the transmission range and coverage can be extended. Similar to the conventional mmWave massive MIMO system, precoding plays an important role in the UAV-assisted mmWave massive MIMO system to compensate for the high path-loss by the high antenna array-gain.

Hybrid precoding can be realized by two typical architectures, namely (a) a "fully-connected" architecture and (b) a "sub-connected" architecture (and may involve a number of "more-connected" and "less-connected" architectures between two extremes). A "fully-connected" architecture is an architecture in which each RF chain is connected to all of the antennas (or all of the antenna elements of an antenna array or sub-array) via a network of elements including phase-shifters. The fully-connected architecture can provide the near-optimal sum-rate performance but at the cost of high energy-consumption due to a large number of phase-shifters. As the number of base-station antennas may be very large, the fully-connected architecture requires a large number of phase-shifters. In contrast, a "sub-connected" architecture is an architecture where each RF chain is only connected to a subset of antennas (possibly just one antenna) via a network of phase-shifters. This can save energy consumption compared to the fully-connected architecture but it suffers from performance degradation.

FIG. 3 shows the two precoding architectures (or "states") which are usually used for the purpose of hybrid precoding in mmWave massive MIMO systems, namely (a) a fully-connected architecture; and (b) a sub-connected architecture.

The analog precoder with fully-connected architecture 30a (shown in part (a) of FIG. 3) comprises a plurality of phase shifters (denoted generally at 34a) and a plurality of RF combiners (denoted generally at 36a). Each RF combiner is coupled to an antenna element (denoted generally at 38a).

The analog precoder 30a receives a plurality of analogue signals (via inputs denoted generally at 32a) from the RF chains between itself and a digital precoder. The phase shifters 34a operate to control the phase of each received RF chain analogue signal. Each RF combiner 36a operates to combine the precoded analog signals and map the combined signal to a respective antenna 38a.

In this fully connected architecture (i.e. as shown in part (a) of FIG. 3), N38a=N36a; N38a≥N32a; N34a=N32a× N38a, where N32a is the number of input RF chains, N34a is the number of phase shifters, N36a is the number of RF combiners and N38a is the number of antenna elements.

The analog precoder with sub-connected architecture 30b (shown in part (b) of FIG. 3) comprises a plurality of phase shifters (denoted generally at 34b) which are divided into subsets according to the antenna elements (denoted generally at 38b). Each of the input RF chain signals (received via the respective inputs denoted generally at 32b) is only connected to one subset of the phase shifters 34b. In this sub-connected architecture (i.e. as shown in part (b) of FIG. 3), N38b=N34b; N38b=Ls×N32b; N38a≥N32b; Ls≥1, where N32b is the number of input RF chains, N34b is the number of phase shifters, N38b is the number of antennas and the Ls is the size of a subset (the number of phase shifters in each subset).

In MIMO transmitters, receivers and transceivers in general, and in particular in relation to UAV-assisted mmWave massive MIMO systems, it is desirable to provide the higher sum-rate performance, but as discussed above, the power or amount of energy available (in particular on a UAV) may be limited (i.e. on a UAV, power is generally provided by an on-board power-supply such as a battery or via a solar panel device, so is generally a constrained resource). If a UAV has a battery as its power-supply, this would generally place a limit on the total amount of energy available before needing to re-charge the battery (which generally involves the UAV returning to a location on the ground), and would generally have a (potentially variable, potentially unreliable, generally decreasing) limit on the level of power that it can provide. Even with a power-supply based on solar power, while this may avoid or postpone the need for the UAV to land to re-charge, there would generally be a variable limit on the level of power that can be provided on-board the UAV. Such factors affect the applicability of current hybrid precoding techniques in relation to UAV-assisted mmWave massive MIMO systems.

Thus, in view of the above, there is a need to develop a new hybrid precoding architecture design for the UAV-assisted mmWave massive MIMO systems.

Referring to various prior disclosures, a paper entitled "UAV air-to-ground channel characterization for mmWave systems" by Wahab Khawaja, Ozgur Ozdemir and Ismail Guvenc (Vehicular Technology Conference (VTC-Fall), 2017 IEEE 86th) discusses the characterization of mmWave air-to-ground (AG) channels for UAV communications, using ray-tracing simulations to study the behavior of AG mmWave bands at different frequencies.

A paper entitled "Relay Hybrid Precoding Design in Millimeter-Wave Massive MIMO Systems" by X. Xue, Y. Wang, L. Dai and C. Masouros (IEEE Transactions on Signal Processing, vol. 66, no. 8, pp. 2011-2026, 15 Apr. 15, 2018) discusses relay hybrid precoding design in mmWave massive MIMO systems.

A paper entitled "Phase Shifters vs Switches: An Energy Efficiency Perspective on Hybrid Beamforming" by S. Payami, N. M. Balasubramanya, C. Masouros, and M. Sellathurai (IEEE Wireless Communications Letters, Vol. 8, No. 1, February 2019) discusses how hybrid beamforming architectures may provide promising to harness the benefits of massive MIMO systems by incorporating phase shifters, switches or their combinations, and addresses the design of such architectures from an energy efficiency perspective, providing closed-form expressions to compare various hybrid beamforming architectures, and deriving optimal numbers of antennas required for maximizing energy efficiency.

A paper entitled "Hybrid Analog-Digital Beamforming for Massive MIMO Systems" by Shahar Stein and Yonina C. Eldar (available online at www.arxiv.org) discusses massive MIMO systems and how hybrid beamforming assists in exploiting the potential array gain without using a dedicated RF chain for each antenna. It considers the data phase in a massive MIMO communication process, where the transmitter and receiver use fewer RF chains than antennas, and examines several different fully—and partially—connected schemes.

A paper entitled "Partially-Activated Conjugate Beamforming for LoS Massive MIMO Communications" by Wendong Liu, Zhaocheng Wang, Jianfei Cao and Sheng Chen (IEEE Access PP(99):1-1, October 2018) proposes a partially-activated conjugate beamforming (PACB) for massive MIMO communications, where the line-of-sight (LoS) channel is dominant. Unlike conventional conjugate beamforming, which activates all of the antenna elements to radiate the signals, the proposed PACB activates only a fraction of the antennas by exploiting the spatial structure of the LoS channel, to mitigate inter-user interference and enhance downlink spectral efficiency.

Referring now to patent documents, Chinese application CN107809274 relates to a hybrid precoding method based on a novel phase-shift switching network.

U.S. Pat. No. 9,967,014 (Park et al.) relates to apparatus, methods and systems for beamforming in antenna systems.

SUMMARY

According to a first aspect of the disclosure, there is provided a Multiple-Input Multiple-Output (MIMO) transmitter comprising a digital signal processor configured to perform pre-coding on a plurality of data streams; a plurality of radio-frequency (RF) chains each configured to pass a pre-coded data stream from the digital signal processor to generate a signal representing that data stream; an antenna array comprising a plurality of antenna elements; a switching unit configured to connect the plurality of RF chains to the plurality of antenna elements in one of a first or second state in which: in the first state, at least one RF chain of the plurality of RF chains is connected to a first subset of the plurality of the antenna elements, and in the second state, the at least one RF chain of the plurality of RF chains is connected to a second subset of the plurality of antenna elements, wherein the first and second subsets in respect of the at least one RF chain have a different number of antenna elements; and a power control unit configured to determine an energy availability measure and/or a power demand measure and, in response, cause the switching unit to connect the plurality of RF chains to the plurality of antenna elements in either the first or second state.

By virtue of the features as set out, some embodiments may switch between at least the first and second state in response to determinations by the power control unit of energy availability measures and/or power demand measures.

In response to such determinations of energy availability measures and/or power demand measures, the switching unit may be configured to switch the state in respect of just one RF chain, some of the RF chains or all of the RF chains of the plurality of RF chains, in order to place the MIMO transmitter in what are termed a fully-connected state or a sub-connected state, or (where there are more than two states) to place the MIMO transmitter in "more-connected" or "less-connected states" in dependence on such determinations.

There may be more than two states in respect of a particular RF chain, with the RF chain in question being connected to different subsets of the plurality of the antenna elements in each of the states, the different subsets having different numbers of antenna elements ranging from just one antenna element up to all of the possible antenna elements.

An RF chain may include entities including (but not limited to) an analog-to-digital converter, a digital-to-analog converter, at least one phase-shifter and at least one filter, the entities of a particular RF chain being configured to perform their respective functions in respect of the data stream provided to and/or the signal generated by that RF chain.

According to some embodiments, the energy availability measure may be a measure of or a measure indicative of one or more of the following: an amount of energy remaining in a power source from which the transmitter obtains power; a power level that can be provided by a power source from which the transmitter obtains power; and a voltage level that can be supported by a power source from which the transmitter obtains power.

According to some embodiments, the power demand measure may be a measure of or a measure indicative of a power level that is required to be provided by a power source from which the transmitter obtains power.

The energy availability measure may be directly measured from a present state of the power source or may be estimated or predicted based on past measurements thereof. It may be dependent on or based on present and/or past measurements of the amount of energy remaining in the power source and/or on present and/or past measurements of power levels provided by the power source and/or on present and/or past measurements of voltage levels supported by the power source. It may be based on present and/or past measurements of electrical properties of the power source, such as voltage, current and/or internal resistance measurements.

The power demand measure may be directly measured from a present level of power being provided by the power source to the transmitter and/or to other devices or may be estimated or predicted based on past measurements thereof. It may be dependent on or based on information indicative of predicted future demand or of future changes in demand in respect of the transmitter and/or other devices such as a system or vehicle on which the transmitter is implemented.

According to some embodiments, the MIMO transmitter may be implemented on or as a part of a relay node.

According to some embodiments, the MIMO transmitter may be implemented on or as a part of an Unmanned Vehicle.

According to some embodiments, the MIMO transmitter may be implemented on or as a part of an Aerial Vehicle.

According to some embodiments, the MIMO transmitter may be implemented on or as a part of a vehicle having a battery power source.

Alternatively or in addition to the relay node, vehicle or other system on which or as a part of which the MIMO transmitter is implemented utilizing a battery power-source, the relay node, vehicle or other system may utilize a power-generator such as solar power, wind turbine, etc.

Where the MIMO transmitter is implemented on a relay node and/or on a vehicle, the power demand measure may be dependent on direct measurements of the present level of power being provided by the power source to the relay node and/or to the vehicle in question or may be estimated or predicted based on past measurements thereof. It may be dependent on or based on information indicative of predicted future demand or of future changes in demand in respect of the power required to be provided to the relay node and/or to the vehicle in question.

According to some embodiments, the first subset in respect of the at least one RF chain may include a single antenna element.

According to a second aspect of the disclosure, there is provided a Multiple-Input Multiple-Output (MIMO) receiver comprising an antenna array comprising a plurality of antenna elements each arranged to receive a wireless communication signal; a switching unit configured to connect the plurality of antenna elements to a plurality of RF chains in one of a first or second state in which: in the first state, at least one RF chain of the plurality of RF chains is connected to a first subset of the plurality of the antenna elements, and in the second state, the at least one RF chain of the plurality of RF chains is connected to a second subset of the plurality of antenna elements, wherein the first and second subsets in respect of the at least one RF chain have a different number of antenna elements; each RF chain being configured to pass a signal received from the subset of antenna elements to which it is connected to generate a digital signal; a digital signal processor configured to receive the digital signals generated from each RF chain and to perform combining of those signals to generate a plurality of data streams; and a power control unit configured to determine an energy availability measure and/or a power demand measure and, in response, cause the switching unit to connect the plurality of RF chains to the plurality of antenna elements in either the first or second state.

According to a third aspect of the disclosure, there is provided a MIMO system comprising a MIMO transmitter according to the first aspect and a MIMO receiver according to the second aspect.

According to a fourth aspect of the disclosure, there is provided a method of operating a Multiple-Input Multiple-Output (MIMO) transmitter, the method comprising performing pre-coding on a plurality of data streams at a digital signal processor; via each of a plurality of radio-frequency (RF) chains, passing a pre-coded data stream from the digital signal processor to generate a signal representing that data stream; configuring a switching unit to connect the plurality of RF chains to a plurality of antenna elements of an antenna array in one of a first or second state in which: in the first state, at least one RF chain of the plurality of RF chains is connected to a first subset of the plurality of the antenna elements, and in the second state, the at least one RF chain of the plurality of RF chains is connected to a second subset of the plurality of antenna elements, wherein the first and second subsets in respect of the at least one RF chain have a different number of antenna elements; and determining an energy availability measure and/or a power demand measure and, in response, causing the switching unit to connect the plurality of RF chains to the plurality of antenna elements in either the first or second state.

According to a fifth aspect of the disclosure, there is provided a method of operating a Multiple-Input Multiple-Output (MIMO) receiver, the method comprising receiving a wireless communication signal at each of a plurality of antenna elements of an antenna array; configuring a switching unit to connect the plurality of antenna elements to a plurality of RF chains in one of a first or second state in which: in the first state, at least one RF chain of the plurality of RF chains is connected to a first subset of the plurality of the antenna elements, and in the second state, the at least one RF chain of the plurality of RF chains is connected to a second subset of the plurality of antenna elements, wherein the first and second subsets in respect of the at least one RF chain have a different number of antenna elements; each RF chain being configured to pass a signal received from the subset of antenna elements to which it is connected to generate a digital signal; receiving the digital signals generated from each RF chain at a digital signal processor and combining those signals to generate a plurality of data streams; and determining an energy availability measure and/or a power demand measure and, in response, causing the switching unit to connect the plurality of RF chains to the plurality of antenna elements in either the first or second state.

According to a sixth aspect of the disclosure, there is provided a method of operating a Multiple-Input Multiple-Output (MIMO) transceiver system, the method comprising performing a method according to the fourth aspect and a method according to the fifth aspect.

The various options and embodiments referred to above in relation to the first aspect are also applicable in relation to the second, third, fourth, fifth and six aspects.

BRIEF DESCRIPTION OF THE DRAWINGS

Preferred embodiments of the disclosure will now be described with reference to the appended drawings, in which:

FIG. 1 illustrates a UAV-assisted mmWave MIMO system.

FIG. 2 shows an example of a fully digitally pre-coded MIMO transmitter.

FIG. 3 shows two hybrid precoding implementations which are often used for the purpose of hybrid precoding in mmWave massive MIMO systems.

FIG. 4 shows a system configuration suitable for providing hybrid precoding for a UAV-assisted mmWave massive MIMO system.

FIG. 5 shows elements of a MIMO transmitter according to an embodiment and elements interacting therewith.

FIG. 6 illustrates the decision-making process that may be used by a power control unit of a MIMO transmitter or MIMO receiver according to an embodiment.

FIG. 7 is a block diagram of a computer system suitable for use in the operation of embodiments of the present disclosure.

DETAILED DESCRIPTION

With reference to the accompanying figures, methods and apparatus according to preferred embodiments will be described.

Various embodiments will be described primarily with reference to a UAV-mounted relay having a MIMO transmitter, the transmitter and associated elements conveying signals received from a source such as base-station 10 in FIG. 1 to one or more destinations such as mobile stations 15 in FIG. 1. It will be appreciated that the description in general applies in a corresponding manner to "mirror-image" embodiments such as a UAV-mounted relay having a MIMO receiver, the receiver and associated elements conveying signals received from sources such as mobile stations 15 to a destination such as base-station 10, and to embodiments such as a UAV-mounted relay having a MIMO transceiver, the transceiver and associated elements conveying signals in both directions. It will be appreciated that the description in general also applies to embodiments such as MIMO transmitters, receivers and transceivers not mounted on a UAV or other such vehicle or relay. While the following description focusses primarily on the link between a UAV (acting as a relay) and a number of mobile stations, the same principles are similarly applicable in relation to the link between a UAV and a base station. Also, while the possibly-varying availability of power and the possible need (or desire) to be able to switch between more energy-intensive (and generally higher data-rate) and more energy-efficient (but generally lower data-rate) states is generally less of an issue in relation to fixed, ground-based entities such as base-stations than it is in relation to airborne and/or mobile devices such as UAVs acting as mono- or bi-directional relays, ground-based entities such as base-stations may in some scenarios have a similar need to switch between higher- and lower-power states, and embodiments of the invention are therefore also applicable in relation to such entities, e.g. a ground-based base-station acting only as a transmitter, for example.

As used in this document, the phrase "millimeter-wave band" refers to frequencies from around a few gigahertz (for example 3.0 GHz) to a few hundred gigahertz. The radio waves in cellular bands may have fewer propagation losses and provide better coverage but may also use a relatively small number of antennas. On the other hand, radio waves in millimeter-wave bands may suffer higher propagation losses but lend themselves well to the high-gain antenna or antenna-array designs in a small form-factor.

FIG. 4 illustrates by way of example a system configuration suitable for providing hybrid precoding on a UAV, suitable for use in relation to a UAV-assisted mmWave massive MIMO system.

The source (which may be a base-station such as BS 10 in FIG. 1) has a hybrid precoder 40 which has multiple antennas (generally 408) and may include multiple RF transceivers and transmitter circuitry (not shown). The antennas may include an array of sub-arrays of antennas. Therefore each antenna shown may represent a sub-array that may include one or more antennas. Each sub-array of antennas is configured to beam-form signals transmitted to and received from the sub-array. The transmitter (TX)-processing circuitry encodes, multiplexes and digitizes the outgoing baseband data to generate processed baseband signals. The RF transceivers receive the outgoing processed baseband signals from the transmitter processing circuitry, up-converts the baseband signal to RF signals, and performs RF precoding on the RF signals that are transmitted via the antennas 408.

The destination (which may be a mobile-station such as one of those shown as MS 15 in FIG. 1) has a hybrid combiner 45 which has multiple antennas (generally 458) and may include multiple RF transceivers and receiver circuitry (not shown).

The RF transceivers at the destination receive from the antennas 458 incoming RF signals such as signals transmitted by the base-station. The RF transceivers perform RF combining (i.e. beamforming at the various sub-arrays) and down-convert the incoming RF signals to generate baseband signals. The baseband signals are sent to the receiver (RX)-processing circuitry, which generates processed baseband signals by filtering, decoding and digitizing the baseband signals. The RX processing circuitry would then generally transmit the processed baseband signals to a controller/processor (not shown) for further processing.

At the UAV, as shown in FIG. 4, the system has a first channel 42 from the source (e.g. the base-station 10) to the UAV 43 and a second channel 44 from the UAV 43 to the destination (e.g. a mobile station 15). The hybrid precoding at the base-station and the hybrid combining at the mobile station may be performed as explained above. The following explanation therefore concentrates on the process of hybrid precoding at the UAV 43. For simplicity, this explanation will be provided primarily in relation to the situation where the source is the base-station (BS) 10 and the destination is a mobile-station (MS) 15, but it will be appreciated that the elements on the UAV 43 may also be processing signals travelling in the opposite direction (i.e. from a mobile-station 15 to the base-station 10).

Firstly, the receiving analog combiner 420 is employed for signals received at antennas 428 from the base-station 10. Then, the digital precoder 430 (which may be a functional module of a digital precoder/combiner if the UAV is configured to process signals in both directions, i.e. from BS 10 to MS 15 as well as from MS 15 to BS 10) processes the signals into the baseband. Next, the analog precoder 440 is used to forward the transmitted signal at the UAV to a mobile-station via antennas 448 of the analog precoder 440 and antennas 458 on the hybrid combiner the mobile-station. This is the general hybrid precoding process for UAV-assisted mmWave massive MIMO systems. However, we now explain in detail a proposed technique with switches and phase-shifters which allows both the fully-connected and sub-connected architectures to be implemented at the UAV and which allows switching between the two architectures according to the requirements explained with reference to FIG. 5.

In comparison with the hybrid precoding at the base-station 10 and the mobile station 15, the hybrid precoding method set out here for the UAV-assisted system is very different from that for a traditional MIMO mmWave system. This explanation will focus on the "amplify and forward" UAV for a mmWave massive MIMO system without the direct link between the source and destination as shown in FIG. 5. For simplicity we will consider a scenario where there is no Non-Line-of-Sight (NLOS) communication, so all the channels are Line-of-Sight (LOS). For the precoding, we take a situation in which the channel 42 (i.e. between the source 40 (e.g. the base station 10) and the UAV 43 (or other such relay 13) and the channel 44 (i.e. between the UAV 43 (or other such relay 13) and the destination 45 (e.g. a mobile station 15) are known at the source, UAV, and the destination. In practical systems, channel state information (CSI) received at the UAV can be obtained via training from the source to the UAV, and the CSI received at the destination can be obtained via training from the UAV to the destination. Then the CSI is shared with the transmitter at the UAV via feedback from the UAV to the source, and the CSI transmitted at the source is shared by the feedback from the UAV to the destination.

As mentioned above, traditional hybrid precoding techniques are not generally applicable due to power limitations at UAVs. Therefore, unlike these existing techniques, the technique employed here uses a combination of phase-shifters (PSs) (generally 554) and energy-efficient switches (generally 552).

Before going on to discuss the overall functionality of the elements shown in FIG. 5, it will be noted that two RF chains (generally 54) are shown, marked as "RF Chain 1" and "RF Chain 2", and four antennas 558 are shown, marked as TX1, TX2, TX3 and TX4. Between the two RF chains 54 and the four antennas 558 is a switching unit 550 of the analog precoder 55. The switching unit (shown within a dashed-line box) comprises eight switches 552, each switch acting in respect of a connection to one of eight phase-shifters 554. The eight connections are paired via four RF combiners 556 to respective ones of the four antennas 558. Connections from/to RF chain 1 are shown in FIG. 5 as unbroken lines, while connections from/to RF chain 2 are shown as dotted lines—this is intended to make it easy to identify (in the figure) the RF chain to which the respective connection relates.

Further, each of the switches is marked in FIG. 5 with an "s-number" or "switch-number", the s-number indicating which RF chain and which antenna are connected (or disconnected) via the switch. Thus the switch having number s11, when closed, would connect RF chain 1 to antenna TX1, while the switch having number s24, when closed, would connect RF chain 2 to antenna TX4.

The digital precoder 51 takes inputs from the analog combiner and applies subcarrier-dependent digital precoding before passing the precoded signal to the Inverse Fast Fourier Transform (IFFT) stage. The signals for each RF chain pass through an "M-point Inverse Fast Fourier Transform" module 52, where M is the number of sub-carriers, converting the frequency-domain signal into a time-domain digital signal. Each symbol passed from the M-point IFFT 52 then has a cyclic prefix added by the "Add CP" module 53, before passing it on to the applicable RF Chain 54. The RF chain will generally include functions such as: digital-to-analogue (DAC) conversion, mixers and frequency converters. This digital block may be used to convert the baseband single into the RF domain. (NB For a receiver, a reverse order and set of functionalities would generally be used, e.g. the DAC being replaced by an analogue-to-digital converter (ADC), and the IFFT being replaced by a Fast Fourier Transform (FFT) module.)

Signals from RF chain 54 are passed to the switching unit 550. If a switch "sXn" is closed, then the signal from "RF chain X" will be passed to antenna "TXn" via the relevant phase shifter 554 and combiner 556. If switch "sXn" is open, then no signal will be passed from "RF chain X" towards antenna "TXn". In such a case the relevant phase shifter can be turned off.

As will become apparent, both fully-connected architectures and sub-connected architectures are thus made possible, with the switching between them being performed in a particular manner that differs from prior hybrid precoding techniques.

As explained earlier, sometimes performance may be a high priority with energy-consumption being less-important, so the UAV can operate in fully-connected (or more-connected) mode and be able to provide the higher sum-rate performance. At other times, such as when power-consumption becomes a priority (e.g. if demands for service are low, or if battery-power is low, or if the UAV determines or is informed that it needs to remain operational for a longer period of time than was previously expected), it can switch to the sub-connected (or a less-connected) architecture by utilizing the extra switches incorporated in the new system.

It will be noted that as well as "fully-connected" architectures in which each RF chain is connected to all of the antennas (or all of the antenna elements of an antenna array or sub-array), and one or a range of "sub-connected" architectures in which each RF chain is only connected to a subset of the antennas (possibly just one antenna), architectures in which one or more antenna elements are no longer connected to any RF chains are also possible.

Looking in more detail at FIG. 5, a power control unit 50 performs the task of determining an "energy availability measure" and/or a "power demand measure" and, in response to either or both (or changes in either or both), can instruct or cause a switching unit 550 to change the architecture to a more-connected or less-connected architecture by connecting one or more RF chains to or disconnecting one or more RF chains from one or more of the antenna elements. In the present example, a switch control unit (SCU) 58, which is shown for convenience as being a part of the power control unit 50, performs the task of controlling the switches 552 in the switching unit 550, but the SCU 58 need not be a functional module of the power control unit 50—it may be a separate module, or its function may be integral to the power control unit 50. The SCU 58 in this example is connected to a power-monitoring unit 56 having one or more power-monitoring sensors which continuously monitor the available power resources at the UAV, and may also obtain information about data requirements from a data-rate measurement unit 57 (e.g. an admission control unit). As with the SCU 58, the power-monitoring unit 56 and the data-rate measurement unit 57 are shown for convenience as being modules of the power control unit 50, but either or both may be separate modules which communicate with the power control unit 50 by (wired or wireless) telemetry or otherwise, or may be functionally integral to the power control unit 50. Based on the data power and/or energy data it obtains (itself or from externally), the power control unit 50 then makes an informed decision over which architecture to use, then causes the SCU 58 to configure the switches 552 in the switching unit 550 for the chosen architecture.

Typically UAVs/drones use a telemetry system to report on various aspects of the drone status, so data obtained via this may be used by the power control unit 50 to determine energy availability measures in dependence on which to base possible decisions to switch the architecture to more- or less-connected architectures. Battery indications may be given as a percentage (or estimated percentage) of a known maximum level of the amount of energy left in the battery, or of the maximum power the battery is still capable of providing, and may be based on measurements of current, voltage or internal resistance. Further, data obtained from antennas, phase-shifters, amplifiers or other electronic components of the signal processing or transmitting parts of a system on a drone, or other components of a drone such as motors may be used by the power control unit 50 to determine power demand measures on which to base possible decisions to switch the architecture to more- or less-connected architectures.

Simple battery monitoring devices may be used that send messages when one or more voltage level thresholds are crossed, which could be used as triggers for switching to different (less-connected) levels of sub-connected architecture as voltage decreases, for example, or possibly for switching to different (more-connected) architectures when the battery is recharged, for example (e.g. using solar power).

From battery percentage levels or otherwise, a remaining flight duration may be calculated/estimated, for example, with decisions to switch to less-connected architectures being triggered if desired/instructed flight time is extended (or vice versa), or if a battery percentage level starts to reduce more quickly than previously estimated (e.g. an increase in traffic rate requiring more radio processing, leading to shorter battery life) a switch to a less-connected structure may be triggered to restore the flight duration to its previous expectation.

While the communication between the SCU 58 and the power-monitoring unit 56 and the data-rate measurement unit 57 in this example primarily involves the SCU 58 receiving inputs from the power-monitoring unit 56 and/or the data-rate measurement unit 57, there may be some control feedback from the SCU 58 requesting information to be sent with the right frequency or based on relevant thresholds, for example, so the channel 59 between the SCU 58 and the monitoring and measurement units 56, 57 is represented by a bidirectional arrow.

The basic procedure which may be used according to the present embodiment is shown in FIG. 6, which shows the decision-making process for the power control unit 50 and the SCU 58 shown in the example embodiment of FIG. 5. An event can be activated by a periodic review of the system or architecture, by a specific message from a power monitoring sensor in or connected to the power monitoring unit 56 (i.e. in a power control unit 50 of the UAV or otherwise) or from the data-rate measurement unit 57 (e.g. an admission control unit), or otherwise.

The power control unit 50 then determines if a change of state or architecture is required. If so, a dedicated message requesting change may be used.

Alternatively, a determination that a change of state or architecture may be required may be triggered by a threshold being exceeded, for example. If for example the UAV determines or is instructed that it needs to remain airborne for an additional period of time (e.g. a further two minutes), and that this increase takes or will take the total amount of time above a threshold (e.g. a 5 hour threshold), this may trigger a decision that a change of state or architecture is required, or that a determination needs to be made in respect thereof.

It should be noted that the power-monitoring sensors may monitor power requirements or state of the MIMO transmitter or relay (or components thereof) and/or the power requirements of the UAV as a whole (or components thereof), and/or may directly monitor the current or ongoing state of the on-board power-supply, for example.

Referring to FIG. 6, once the system is active (i.e. after powering-up, take-off, or another such "START" s60), the process in this example may be activated by one or more sensors in or monitored by the power monitoring unit 56 sending a message about a change in power consumption requirements (s61) and/or an admission control unit sending a message about a change in resource demand and/or importance (s62). Either (or both) of these can trigger a decision as to whether or not a change of state or architecture is required (s64). If not, the process returns to waiting for a message.

If it is decided at s64 that a change of state or architecture is required, the power control unit 50 then decides what architecture should be selected (s66). In this example, this is based on the power and performance requirements. Energy efficiency will favor the most (or a more) sub-connected configuration, while performance enhancement will favor the most (or a more) fully-connected configuration. The power control unit 50 may opt for one of these extremes, or a configuration between the two extremes.

If the selected configuration is different from that currently in use, the SCU 58 in the power control unit 50 instructs the relevant switches 552 in the switching unit 550 to be opened or closed. It may (generally at the same time) inform the digital precoder 51 of the change in configuration, but during the switching process itself the primary function is to instruct the switching unit 550 to open or close the appropriate switches 552. As can be seen, if all of the switches were closed, then switches s24 and s23 of RF chain 2 and switches s13 and s14 of RF chain 1 are opened, a change from the fully-connected architecture to a sub-connected architecture will be caused. The power control unit 50 may instruct just the analog precoder 55, with the analog precoder 55 passing an indication of the change to the digital precoder 51, for example. Further, when a particular switch 552 is opened, the relevant connection between the RF chain 54 and the antenna 558 will be disconnected, so the phase-shifter 554 in question may be turned off while the antenna 558 in question may remain on for data transmission.

The following scenario is provided as an example of how an embodiment of the invention may work. At first, the MIMO transmitter (or receiver, or transceiver) in a UAV 13 is operating in fully-connected architecture providing high data-rate requirements as needed. It may be at peak-time, at which data demand may be higher, for example. The data-rate requirements may then decrease as off-peak hours are reached and high data-rate requirements are no longer needed, at which time it may be appropriate to switch to a sub-connected architecture in order to conserve energy while still remaining operational with lower data-rate requirements. The switching process can be described as follows (with reference to the elements as numbered in FIG. 5):

(i) If the power control unit 50 determines that it is appropriate or necessary to switch from fully-connected architecture to a sub-connected architecture, RF chain 1 will only be connected with transmitting antenna elements TX1 and TX2. To achieve this, switches s13 and s14 are switched off. By doing this the fully-connected architecture is converted into the sub-connected architecture and RF chain 1 is only connected with TX1 and TX2, its connection with TX3 and TX4 being disconnected.

(ii) If the power control unit 50 decides it is appropriate to switch back into the fully-connected architecture, switches s13 and s14 are turned on. By doing this, RF chain 1 is reconnected with TX3 and TX4 resulting in the fully-connected architecture which can provide the higher data-rate, albeit at the cost of higher energy-consumption.

In this way, preferred embodiments provide a hybrid precoding technique for UAV-assisted mmWave massive MIMO systems. In this technique, two precoding architectures (fully-connected and sub-connected) are combined. The additional units (i.e. the SCU 58, the power monitoring unit 56 (including or communicating with sensors to sense the present requirements etc.)) are used as part of a power control unit 50 to allow a determination as to when to switch between the two architectures, which can be achieved using low-cost switches 552 which may be implemented in conjunction with current structures. This can provide a better trade-off between the sum-rate performance and the energy-consumption in a practical deployment of a UAV assisted mmWave massive MIMO system.

FIG. 7 is a block diagram of a computer system suitable for use in the operation of embodiments of the present disclosure. A central processor unit (CPU) 702 is communicatively connected to a data store 704 and an input/output (I/O) interface 706 via a data bus 708. The data store 704 can be any read/write storage device or combination of devices such as a random access memory (RAM) or a non-volatile storage device, and can be used for storing executable and/or non-executable data. Examples of non-volatile storage devices include disk or tape storage devices. The I/O interface 706 is an interface to devices for the input or output of data, or for both input and output of data. Examples of I/O devices connectable to I/O interface 706 include a keyboard, a mouse, a display (such as a monitor) and a network connection.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the disclosure may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A Multiple-Input Multiple-Output (MIMO) transmitter comprising:
   a digital signal processor configured to perform pre-coding on a plurality of data streams;
   a plurality of radio-frequency (RF) chains each configured to pass a pre-coded data stream from the digital signal processor to generate a signal representing that pre-coded data stream;
   an antenna array comprising a plurality of antenna elements;
   a switching unit configured to connect the plurality of RF chains to the plurality of antenna elements in one of a first state or a second state in which:
      in the first state, at least one RF chain of the plurality of RF chains is connected to a first subset of the plurality of the antenna elements, and
      in the second state, the at least one RF chain of the plurality of RF chains is connected to a second subset of the plurality of antenna elements, wherein the first subset and the second subset in respect of the at least one RF chain have a different number of antenna elements; and
   a power control unit configured to determine an energy availability measure based on at least one of a present measurement or a past measurement of a state of a power source from which the MIMO transmitter obtains power and, in response, cause the switching unit to connect the plurality of RF chains to the plurality of antenna elements in either the first state or the second state.

2. The MIMO transmitter according to claim 1, wherein the energy availability measure is a measure of, or a measure indicative of, an amount of energy remaining in the power source from which the MIMO transmitter obtains power.

3. The MIMO transmitter according to claim 1, wherein the energy availability measure is a measure of, or a measure indicative of, a power level that can be provided by the power source from which the MIMO transmitter obtains power.

4. The MIMO transmitter according to claim 1, wherein the energy availability measure is a measure of, or a measure indicative of, a voltage level that can be supported by the power source from which the MIMO transmitter obtains power.

5. The MIMO transmitter according to claim 1, wherein the power control unit is configured to determine a power demand measure used by the power control unit to determine the energy availability measure, and the power demand measure is a measure of, or a measure indicative of, a power level that is required to be provided by the power source from which the MIMO transmitter obtains power.

6. The MIMO transmitter according to claim 1, wherein the first subset in respect of the at least one RF chain includes a single antenna element.

7. The MIMO transmitter according to claim 1, wherein the switching unit comprises a plurality of switches, each switch acting in respect of a connection to a single different respective phase-shifter of the switching unit.

8. The MIMO transmitter according to claim 1, wherein the switching unit comprises a respective switch per RF chain of the plurality of RF chains and per antenna element of the plurality of antenna elements, each switch acting in respect of a connection to a single different respective phase-shifter of the switching unit such that each respective phase-shifter can be turned off if the RF chain associated with the respective phase-shifter is to be disconnected from the antenna element associated with the respective phase-shifter, and wherein the MIMO transmitter comprises a respective RF combiner per antenna element of the plurality of antenna elements, each RF combiner configured to combine an output of each of the phase-shifters associated with a respective antenna element.

9. A relay node comprising the MIMO transmitter according to claim 1.

10. An Unmanned Vehicle comprising the MIMO transmitter according to claim 1.

11. An Aerial Vehicle comprising a MIMO transmitter according to claim 1.

12. A vehicle comprising a battery power source and the MIMO transmitter according to claim 1.

13. A Multiple-Input Multiple-Output (MIMO) receiver comprising:
   an antenna array comprising a plurality of antenna elements each arranged to receive a wireless communication signal;

a switching unit configured to connect the plurality of antenna elements to a plurality of RF chains in one of a first state or a second state in which:
   in the first state, at least one RF chain of the plurality of RF chains is connected to a first subset of the plurality of the antenna elements, and
   in the second state, the at least one RF chain of the plurality of RF chains is connected to a second subset of the plurality of antenna elements, wherein the first subset and the second subset in respect of the at least one RF chain have a different number of antenna elements, each RF chain being configured to pass a signal received from the subset of antenna elements to which it is connected to generate a digital signal;
a digital signal processor configured to receive the digital signals generated from each RF chain and to perform combining of the received digital signals to generate a plurality of data streams; and
a power control unit configured to determine an energy availability measure based on at least one of a present measurement or a past measurement of a state of a power source from which the MIMO transmitter obtains power and, in response, cause the switching unit to connect the plurality of RF chains to the plurality of antenna elements in either the first state or the second state.

14. A Multiple-Input Multiple-Output (MIMO) system comprising:
   the MIMO transmitter as claimed in claim 1; and
   a MIMO receiver comprising:
      an antenna array comprising a plurality of antenna elements each arranged to receive a wireless communication signal;
      a switching unit configured to connect the plurality of antenna elements to a plurality of RF chains in one of a first state or a second state in which:
         in the first state, at least one RF chain of the plurality of RF chains is connected to a first subset of the plurality of the antenna elements, and
         in the second state, the at least one RF chain of the plurality of RF chains is connected to a second subset of the plurality of antenna elements, wherein the first subset and the second subset in respect of the at least one RF chain have a different number of antenna elements, each RF chain being configured to pass a signal received from the subset of antenna elements to which it is connected to generate a digital signal;
      a digital signal processor configured to receive the digital signals generated from each RF chain and to perform combining of the received digital signals to generate a plurality of data streams; and
      a power control unit configured to determine an energy availability measure based on at least one of a present measurement or a past measurement of a state of a power source from which the MIMO transmitter obtains power and, in response, cause the switching unit to connect the plurality of RF chains to the plurality of antenna elements in either the first state or the second state.

15. A method of operating a Multiple-Input Multiple-Output (MIMO) transmitter, the method comprising:
   performing pre-coding on a plurality of data streams at a digital signal processor;
   via each of a plurality of radio-frequency (RF) chains, passing a pre-coded data stream from the digital signal processor to generate a signal representing that pre-coded data stream;
   configuring a switching unit to connect the plurality of RF chains to a plurality of antenna elements of an antenna array in one of a first state or a second state in which:
      in the first state, at least one RF chain of the plurality of RF chains is connected to a first subset of the plurality of the antenna elements, and
      in the second state, the at least one RF chain of the plurality of RF chains is connected to a second subset of the plurality of antenna elements, wherein the first subset and the second subset in respect of the at least one RF chain have a different number of antenna elements; and
   determining an energy availability measure based on at least one of a present measurement or a past measurement of a state of a power source from which the MIMO transmitter obtains power and, in response, causing the switching unit to connect the plurality of RF chains to the plurality of antenna elements in either the first state or a second state.

16. A method of operating a Multiple-Input Multiple-Output (MIMO) receiver, the method comprising:
   receiving a wireless communication signal at each of a plurality of antenna elements of an antenna array;
   configuring a switching unit to connect the plurality of antenna elements to a plurality of RF chains in one of a first state or a second state in which:
      in the first state, at least one RF chain of the plurality of RF chains is connected to a first subset of the plurality of the antenna elements, and
      in the second state, the at least one RF chain of the plurality of RF chains is connected to a second subset of the plurality of antenna elements, wherein the first subset and the second subset in respect of the at least one RF chain have a different number of antenna elements, each RF chain being configured to pass a signal received from the subset of antenna elements to which the RF chain is connected to generate a digital signal;
   receiving the digital signals generated from each RF chain at a digital signal processor and combining the received digital signals to generate a plurality of data streams; and
   determining an energy availability measure based on at least one of a present measurement or a past measurement of a state of a power source from which the MIMO transmitter obtains power and, in response, causing the switching unit to connect the plurality of RF chains to the plurality of antenna elements in either the first state or the second state.

17. A method of operating a Multiple-Input Multiple-Output (MIMO) transceiver system, the method comprising:
   performing the method according to claim 15; and
   operating a MIMO receiver by:
      receiving a wireless communication signal at each of a plurality of antenna elements of an antenna array;
      configuring a switching unit to connect the plurality of antenna elements to a plurality of RF chains in one of a first state or a second state in which:
         in the first state, at least one RF chain of the plurality of RF chains is connected to a first subset of the plurality of the antenna elements, and
         in the second state, the at least one RF chain of the plurality of RF chains is connected to a second subset of the plurality of antenna elements, wherein the first subset and the second subset in respect of the at least one RF chain have a different number of antenna elements, each RF chain being configured to pass a signal received from the subset of antenna elements to which the RF chain is connected to generate a digital signal;

receiving the digital signals generated from each RF chain at a digital signal processor and combining the received digital signals to generate a plurality of data streams; and determining an energy availability measure based on at least one of a present measurement or a past measurement of a state of a power source from which the MIMO transmitter obtains power and, in response, causing the switching unit to connect the plurality of RF chains to the plurality of antenna elements in either the first state or the second state.

* * * * *